United States Patent
Poluri et al.

(10) Patent No.: US 8,291,036 B2
(45) Date of Patent: Oct. 16, 2012

(54) DATACENTER SYNCHRONIZATION

(75) Inventors: Ravi Kiran R. Poluri, Sammamish, WA (US); Samir V. Shah, Kirkland, WA (US); Rui Chen, Kirkland, WA (US); Lin Huang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 12/404,402

(22) Filed: Mar. 16, 2009

(65) Prior Publication Data
US 2010/0235431 A1  Sep. 16, 2010

(51) Int. Cl.
  *G06F 15/16* (2006.01)
  *G06F 7/00* (2006.01)
  *G06F 17/00* (2006.01)
(52) U.S. Cl. ........ 709/217; 709/203; 707/609; 707/610; 707/619
(58) Field of Classification Search .................. 709/217, 709/208; 711/114
  See application file for complete search history.

(56) References Cited

U.S. PATENT DOCUMENTS

| | | | |
|---|---|---|---|
| 7,246,140 B2 * | 7/2007 | Therrien et al. | 1/1 |
| 7,260,625 B2 * | 8/2007 | Sugiura et al. | 709/223 |
| 7,577,805 B2 * | 8/2009 | Amano et al. | 711/161 |
| 7,627,658 B2 * | 12/2009 | Levett et al. | 709/223 |
| 7,739,239 B1 * | 6/2010 | Cormie et al. | 707/626 |
| 7,769,886 B2 * | 8/2010 | Naseh et al. | 709/238 |
| 7,792,792 B2 * | 9/2010 | Witriol et al. | 707/610 |
| 7,827,136 B1 * | 11/2010 | Wang et al. | 707/610 |
| 7,849,213 B1 * | 12/2010 | Borghetti | 709/238 |
| 7,895,463 B2 * | 2/2011 | Bagepalli et al. | 714/4.1 |
| 7,962,580 B2 * | 6/2011 | Gagliardi et al. | 709/219 |
| 8,099,457 B2 * | 1/2012 | Lowery et al. | 709/203 |
| 8,099,499 B2 * | 1/2012 | Oeda | 709/226 |
| 8,112,657 B2 * | 2/2012 | Greenberg | 714/3 |
| 2006/0126201 A1 * | 6/2006 | Jain | 360/15 |
| 2006/0193252 A1 | 8/2006 | Naseh et al. | |

(Continued)

FOREIGN PATENT DOCUMENTS
WO  2008131446 A2  10/2008

OTHER PUBLICATIONS

"How do you Scale HTTP Server like Google?", Retrieved at <<http://stackoverflow.com/questions/210901/how-do-you-scale-http-server-like-google>>, Jan. 21, 2009, pp. 3.

(Continued)

*Primary Examiner* — Peter-Anthony Pappas
*Assistant Examiner* — Muktesh G Gupta
(74) *Attorney, Agent, or Firm* — Microsoft Corporation (57) ABSTRACT

A datacenter infrastructure comprising a plurality of datacenters is configured to provide services to users. Data (e.g., application data) provided to respective datacenters from a user is synchronized between different datacenters comprised within "a cloud" according to a multilevel synchronization scheme. Respective levels of the multilevel synchronization operate to transfer different priority (user) data between the plurality of datacenters, wherein respective priorities are determined based upon the importance of the data in providing a service. For example, data used to perform a service is synchronized by a synchronization component facilitating a higher level of synchronization between datacenters, while data not routinely used to perform a service is synchronized by a lower priority synchronization component. Synchronization between datacenters allows a network address routing system to provide substantially uninterrupted routing of a user to an available or otherwise appropriate datacenter within the datacenter infrastructure, thereby providing increased service reliability and performance.

20 Claims, 9 Drawing Sheets

U.S. PATENT DOCUMENTS

| | | | |
|---|---|---|---|
| 2006/0271544 A1* | 11/2006 | Devarakonda et al. | 707/9 |
| 2008/0046400 A1 | 2/2008 | Shi et al. | |
| 2008/0154850 A1* | 6/2008 | Evans et al. | 707/3 |
| 2008/0201454 A1* | 8/2008 | Soffer | 709/220 |
| 2009/0070477 A1* | 3/2009 | Baum et al. | 709/231 |
| 2009/0150564 A1* | 6/2009 | Anbalagan et al. | 709/241 |
| 2009/0276771 A1* | 11/2009 | Nickolov et al. | 717/177 |
| 2010/0185614 A1* | 7/2010 | O'Brien et al. | 707/736 |
| 2010/0199042 A1* | 8/2010 | Bates et al. | 711/114 |
| 2010/0287280 A1* | 11/2010 | Sivan | 709/226 |

OTHER PUBLICATIONS

Ray, et al., "Deploying Active-Active Data Centers Using Oracle Database Solutions", Retrieved at <<http://www.oracle.com/technology/deploy/availability/pdf/oracle-openworld-2008/300460.pdf>>, pp. 1-59.

"Replication", Retrieved at <<http://www.openldap.org/doc/admin24/replication.html>>, Jan. 21, 2009, pp. 11.

"Full Partner Critical Global DNS System", Retrieved at <<http://www.fullpartner.com/fullpartner/Public/Company/CriticalGlobalDNS/index.cfm>>, Jan. 21, 2009, pp. 4.

"Synchronizing Databases in Different Geographic Locations", Retrieved at <<http://highscalability.com/synchronizing-databases-different-geographic-locations>>, Dec. 8, 2007, pp. 8.

Zimmerman, Bob, "Designing for High Availability", Retrieved at <<http://www.dmreview.com/issues/20040401/1001155-1.html>>, Apr. 2004, pp. 3.

* cited by examiner

FIG. 9

DATACENTER SYNCHRONIZATION

BACKGROUND

Cloud computing refers to the practice of a user utilizing one or more third-party servers to receive services (e.g., run applications, store data, etc.) over a network (e.g., the internet). To achieve this, cloud computing relies upon one or more datacenters (e.g., third party datacenters), respectively comprising a large number of servers. The servers provide services which can be offered to a large number of users through their internet connections. Therefore, a cloud computing architecture allows users to receive services (e.g., data storage, applications, etc.) "from the cloud" rather than having to have the services on their personal computer or local network.

Cloud computing is currently prevalent in web based email, where emails are stored on a remote server (and not a local computer), for example. However, due to its advantages over traditional computing, cloud computing is poised to have a much larger impact on the IT sector in the future. Cloud computing offers a number of advantages at least in that entities have to manage significantly less local hardware and software. Therefore, cloud computing offers a means by which services can be conveniently provided to individuals or corporations dispersed over a large geographic area.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for improving the reliability of services offered over a network (e.g., the internet) is disclosed. As provided herein, a plurality of geographically diverse mega datacenters (datacenters) form a datacenter infrastructure disposed to host services to one or more users through a cloud or other type of computing environment. Respective services provided by the plurality of datacenters are spread across multiple geographically distinct datacenters by using multiple synchronization components to synchronize data between the datacenters. Since the data is synchronized, the different datacenters can host a service to different users at any or substantially any given time. Essentially, this forms a datacenter infrastructure configured according to an active-active configuration, wherein multiple active datacenters are enabled to provide a service to a particular user, thereby providing increased reliability and redundancy as a hedge against datacenter failures and/or any other significant outage in a datacenter.

More particularly, the plurality of datacenters are configured to provide services to users according to a multilevel synchronization scheme, wherein respective levels of the scheme operate to transfer different priority (user) data between the plurality of datacenters. A data's priority is determined based upon the importance of the data in providing a service. Data used to routinely perform a service is synchronized by a higher priority synchronization component which facilitates substantially continuous synchronization between datacenters, while data infrequently used to perform a service may be synchronized by a lower priority synchronization component. For example, data comprising a user's password may be regarded as high priority data since it may need to be available whenever the user decides to access protected information and/or to have a service performed. Similarly, data comprising a user's zip code, for example, may be regarded as lower priority data since that data may not need to be as readily available as it may not be related to the provision of many services.

Synchronization between datacenters allows a network address routing system (e.g., based upon DNS and anycast) to provide substantially uninterrupted routing of a user to an available or otherwise appropriate datacenter within the datacenter infrastructure for a requested service. Specifically, during normal operation, the traffic load of users can be equally balanced between datacenters, whereas during the failure of a datacenter, users can be quickly routed to another active datacenter to mitigate data or service loss.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and components are illustrated in block diagram form in order to facilitate describing the claimed subject matter.

In recent years, the growth of high speed data lines, the falling cost of storage, the advent of wireless high speed networks, and the proliferation of handheld devices with web access (e.g., cell phones, PDAs) have lead to the emergence of cloud computing as an attractive alternative to traditional computing (e.g., desktop computing). Cloud computing environments often utilize an interface program (e.g., web browser) to allow users (e.g., clients) to connect to a cloud which is hosted by one or more remote mega datacenters. The one or more remote mega datacenters (datacenters) are disposed to offer services (e.g., applications, data storage, etc.) to a large number of users. Datacenters are complex, often with hundreds of technology and infrastructure pieces (e.g., comprising data storage servers, application servers, etc.) used for proper operation.

In an increasingly digital society, cloud computing offers a number of advantages over conventional desktop computing. It allows users to access their data from their own computer, from someone else's computer, or from a handheld device. It also allows a significant workload shift, no longer relying upon local devices to perform processing to run applications. Therefore, cloud computing forms a highly dependent relationship between the device and the datacenter. Unfortunately, services hosted by these datacenters can fail, often because of infrastructure failures which are outside of the scope of the service. For businesses depending upon services from a cloud such failures can be extremely costly for every minute that service is lost. Therefore, a continued availability of services allows for the successful operation of cloud computing environments. Current solutions provide for an active-passive solution whereby standby datacenters are activated if an active datacenter fails. However, these solutions typically result in a few hours of costly downtime and data loss. Accordingly, a computing environment is described herein which offers improved service and/or reliability.

As provided herein, a datacenter infrastructure for supporting a cloud or other type of computing environment which provides for an improved reliability of services offered over a network (e.g., the internet) is disclosed. As provided herein, services provided by mega datacenters of a cloud or other type of computing environment are spread across multiple geographically separate datacenters by using multiple synchronization components (multilevel data synchronization) to synchronize data between datacenters. This results in respective datacenters of the datacenter infrastructure having the user data used to provide services to a user. Therefore, the datacenter infrastructure allows a user to be routed to different (e.g., one or more) geographically separate datacenters for a service at a given time, thereby offering continual service by real time rerouting of the user from a failed datacenter to an active datacenter.

In other words, as provided herein, the datacenter infrastructure is configured according to an active-active configuration, wherein multiple active datacenters are enabled to provide a service to a particular user. During a failover of one datacenter such an active-active configuration allows an alternative active datacenter to provide the service with substantially no loss of service to the user.

More particularly, data (e.g., application data, stored data, etc.) provided to a datacenter from a user is synchronized between other datacenters comprised within "the cloud" according to a multilevel synchronization scheme. Respective levels of the multilevel synchronization scheme operate to transfer different priority user data between the plurality of datacenters, wherein a data's priority is determined based upon the importance of the data in providing a service. For example, data used to routinely perform a service is synchronized by a higher priority synchronization component which facilitates substantially continuous synchronization between datacenters, while data not routinely used to perform a service may be synchronized by a lower priority synchronization component. Synchronization between datacenters allows a network address routing system to provide substantially uninterrupted routing of a user to an available or otherwise appropriate datacenter of the datacenter infrastructure for a requested service. Specifically, during normal operation, the traffic load of users can be equally balanced between datacenters, whereas upon the failure of a datacenter, users can be quickly routed to another active datacenter to mitigate data or service loss.

Figure 1:
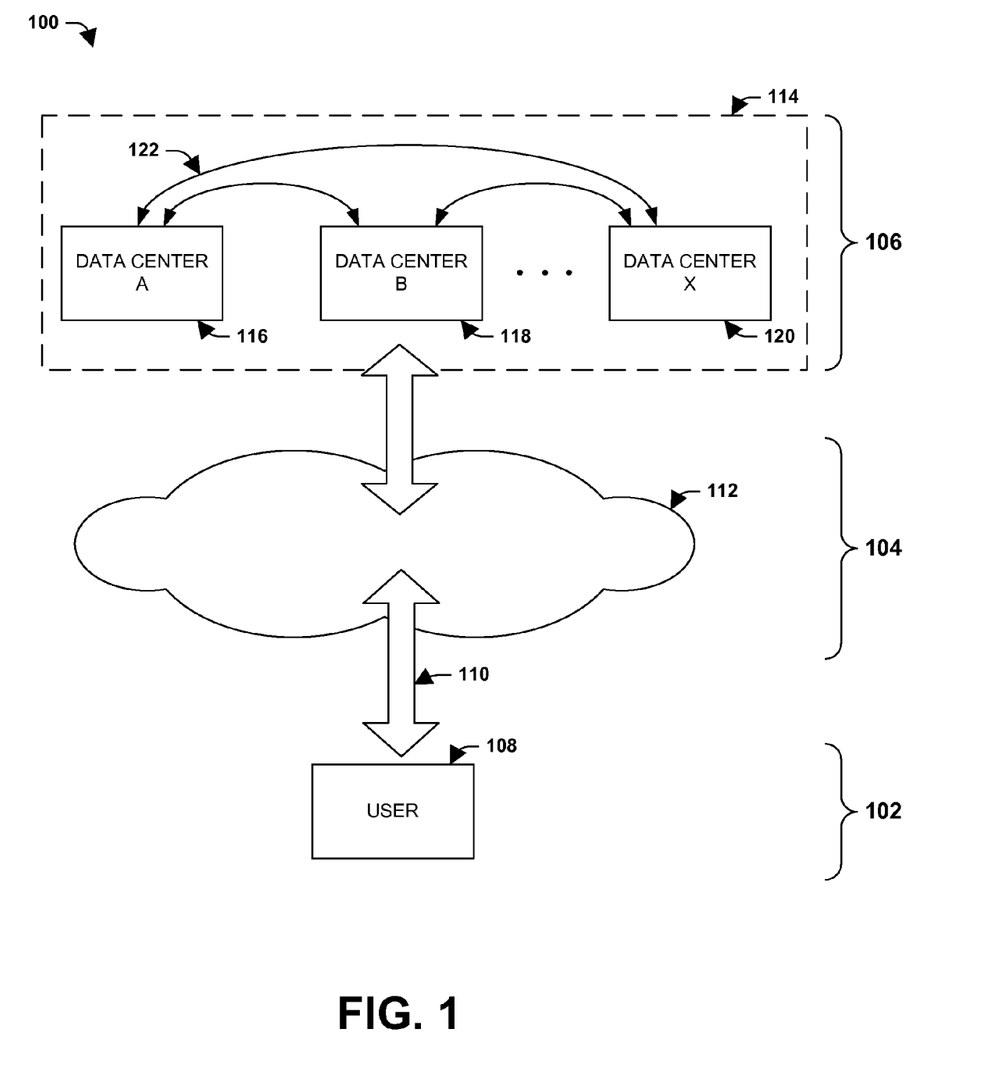
FIG. 1 illustrates a block diagram of an exemplary cloud computing environment as provided herein.

FIG. 1 illustrates an exemplary cloud computing environment as provided herein. As illustrated in FIG. 1, a cloud computing environment comprises a front end 102, a back end 106, and a network 104 (e.g., the internet) configured to connect the front end 102 to the back end 106. The front end 102 comprises one or more users 108 (e.g., one or more user computers) connected to the network 104 by an interface program 110 (e.g., web browser). In one example, the front end 102 may comprise a plurality of computers in a company's local area network. The back end 106 may comprise a datacenter infrastructure having a plurality of infrastructure components including computers, servers, and data storage systems, for example. These components are typically comprised within datacenters (116, 118, and 120) or large clusters of computer hardware configured to provide services over the network 104 to users located at the front end 102.

As illustrated in FIG. 1, a multilevel synchronization component 122 is provided between the datacenters (116, 118, and 120) to allow for synchronization of user data between the datacenters. As provided herein, the multilevel synchronization component 122 performed synchronization depending on a priority of the user data.

Since a plurality of datacenters effectively handle the data received from a user, a service can be provided to the user by one or more of the datacenters during normal operation. This allows for decreased traffic load on a single datacenter. Furthermore, in the event of a failure of a datacenter providing user service, the service can be routed to another datacenter comprised within the datacenter infrastructure to mitigate loss of data or service. For example, in FIG. 1, if datacenter 116 fails while providing service to the one or more users 108, then the user's service can be rerouted to datacenter 118 without substantial interruption since, through synchronization, datacenter 118 also comprises the user's data.

The cloud computing environment may host a large number of users and an even larger number of services. Because of scalability, multiple users in excess of ten thousand may interact within the cloud. This large number of users causes strain on the datacenter infrastructure. Synchronization of datacenters also allows for controlled traffic routing of user data that can alleviate the strain put on the system and provide improved service to users.

Figure 4:
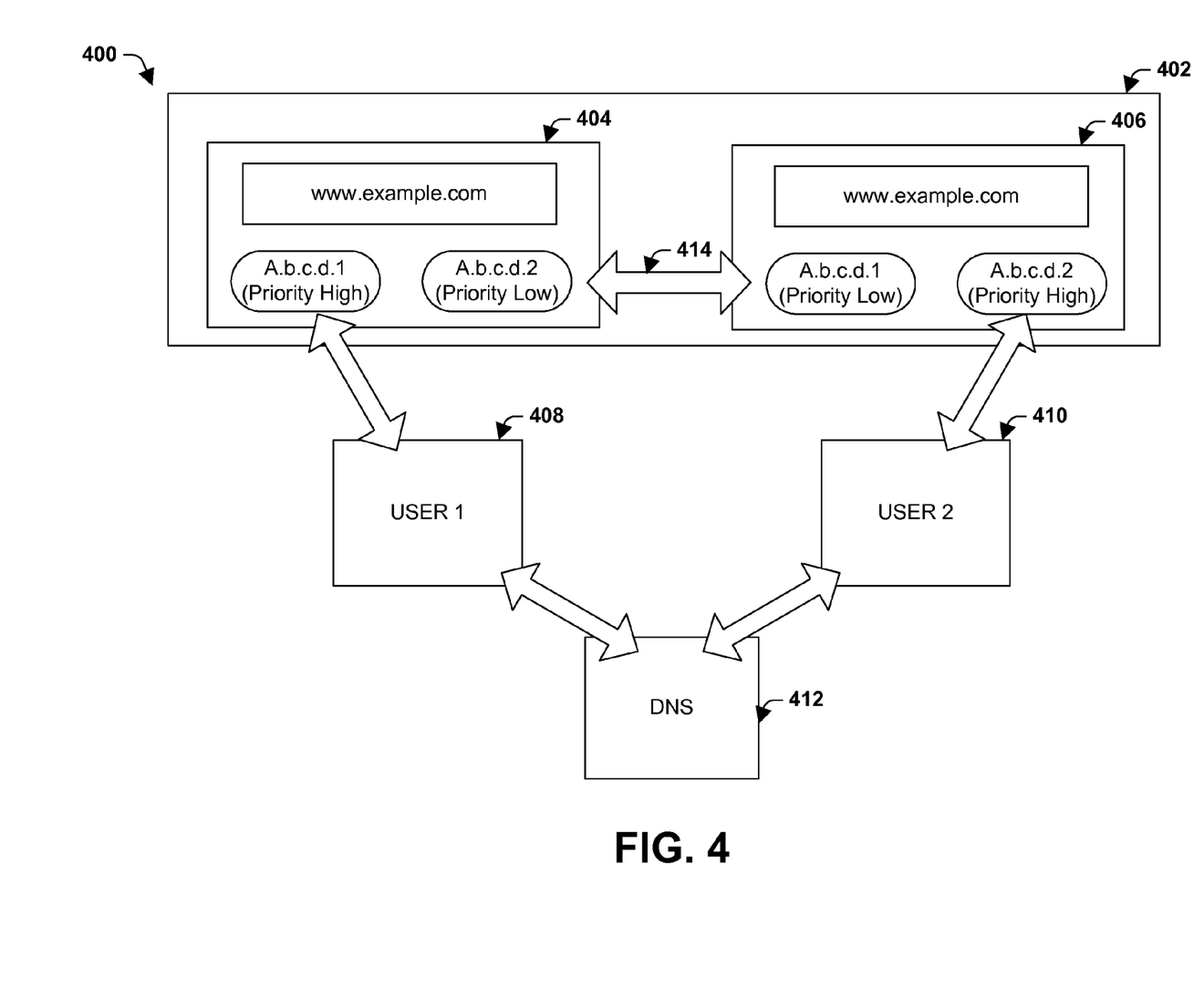
FIG. 4 illustrates a block diagram of a cloud computing environment during normal operation.
Figure 5:
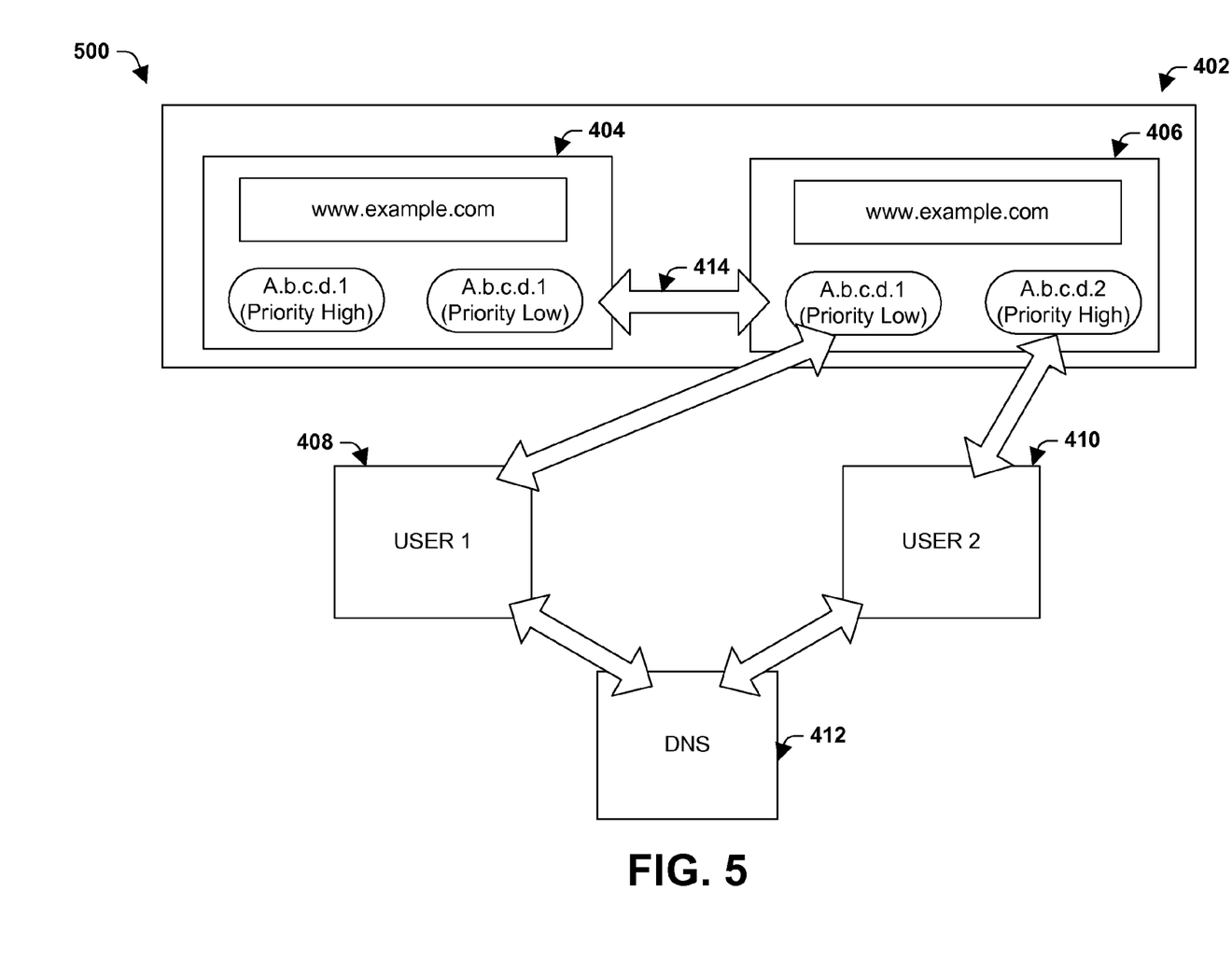
FIG. 5 illustrates a block diagram of a cloud computing environment during a controlled failover.
Figure 6:
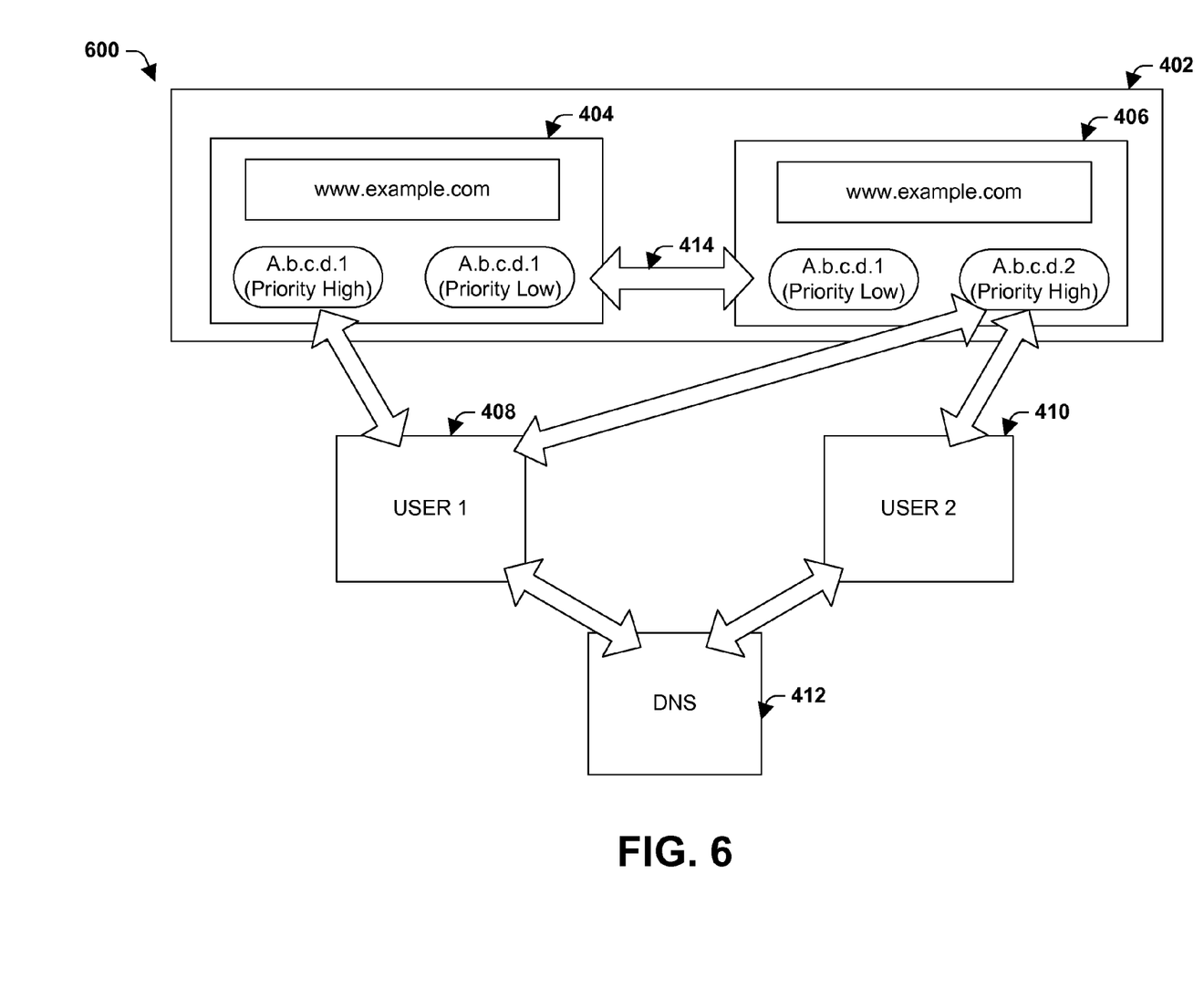
FIG. 6 illustrates a block diagram of a cloud computing environment during a client level failover.

In one particular example, the datacenter infrastructure utilizes a domain name system (DNS) and an anycast routing scheme to provide substantially uninterrupted routing of a user to an available or otherwise appropriate datacenter within the datacenter infrastructure (e.g., FIGS. 4-6). For example, in the event of a failure of datacenter 116, user traffic can be rerouted to datacenter 118 and/or 120. Furthermore, since a plurality of datacenters comprise the user data used to provide a service to a user the use of DNS and anycast also allows datacenters to maintain a high availability through balancing user traffic loads between datacenters. For example, in FIG. 1, if one of the one or more users 108 logs into datacenter 116, the user's requests can be rerouted to datacenters 116, 118, and 120 so that respective datacenters receive substantially one-third of the traffic from the user, thereby reducing the load on respective datacenters.

In one example, rerouting of traffic may be done after a service transaction is complete. In another example, rerouting of traffic may be done in the middle of a service transaction (e.g., data packet transmission). For example, half of a transaction (e.g., account creation) can be performed with datacenter 116 and the other half (e.g., sign-in immediately) can be performed with datacenter 118. The multilevel synchronization may cause user data to be synchronized between datacenters thereby ensuring that datacenters 116 and 118 comprise the complete transaction. Therefore, synchronization allows a plurality of datacenters to offer functionality of a single datacenter with improved service and/or reliability.

Figure 2:
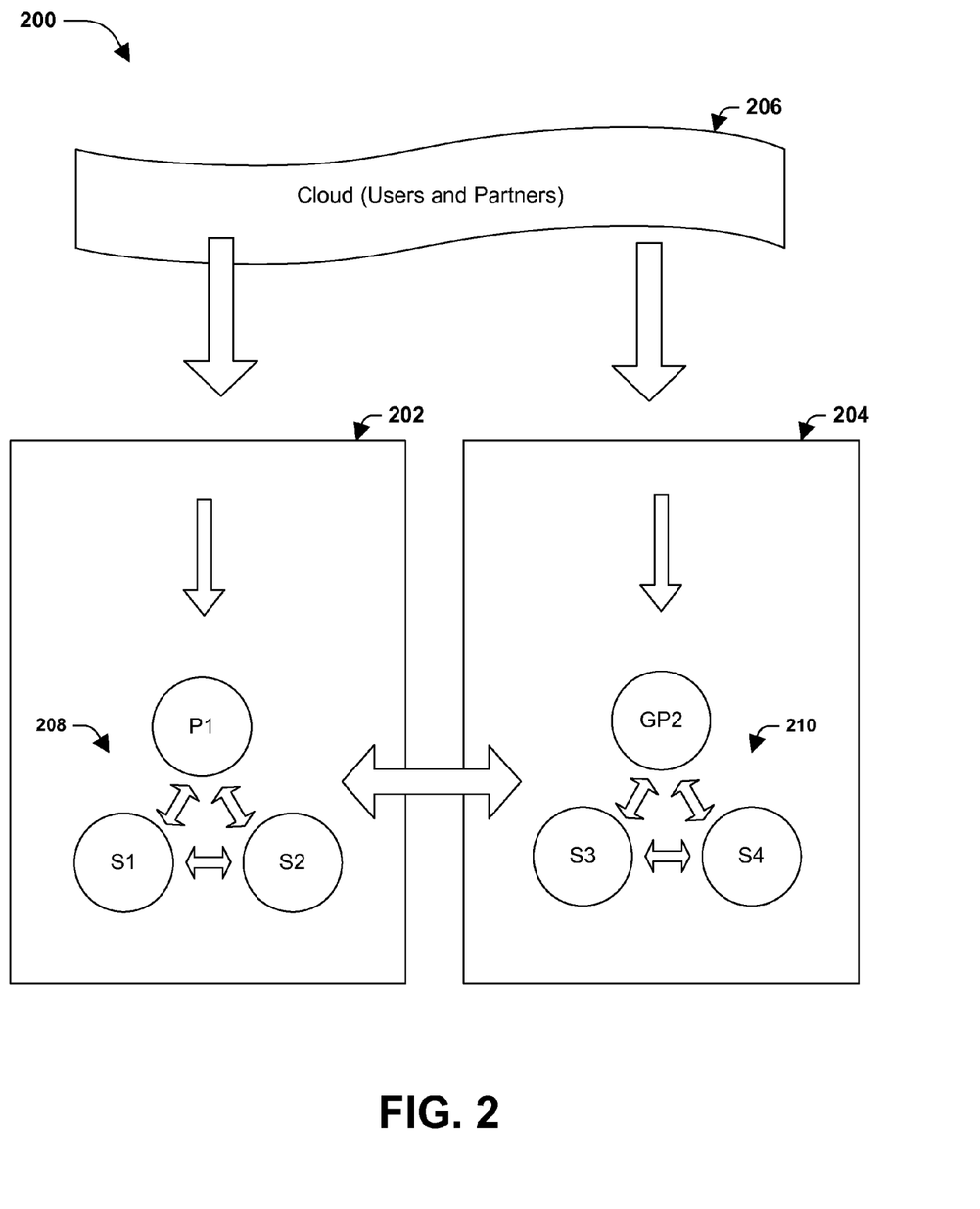
FIG. 2 illustrates a block diagram of a detailed example of datacenters comprised within a cloud computing environment.

FIG. 2 illustrates a detailed example of two datacenters comprised within the disclosed datacenter infrastructure. As illustrated in FIG. 2, the datacenters may be configured according a multi-master topology. In such a topology, respective datacenters comprise a local master server and may comprise additional secondary servers. For example, as illustrated in FIG. 2, datacenter DC1 comprises a primary server P1, a secondary server S1, and a secondary server S2 (e.g., general purposes servers, application servers, etc.). Server P1 is the master server of datacenter DC1 and is configured to receive data from a user. The received user data may also be written to one or more secondary servers (e.g., S1 and S2) through an asynchronous process, thereby creating three copies of the data in datacenter DC1. Storing multiple copies of the received data provides for increased reliability within a single datacenter since the secondary servers can act as a master if the local master server is disabled (e.g., for maintenance). Datacenter DC2 also contains a local master server GP2 and two secondary servers, S3 and S4, configured to comprise received user data.

During multilevel synchronization, user data is replicated between the first and the second datacenters, DC1 and DC2. This replication allows master copies of the user data to exist on servers comprised within multiple datacenters. Since user data may exist on servers within either datacenter, a user can receive services (e.g., run applications, store data) from either datacenter (e.g., either master server of the multi-master topology).

For example, as illustrated in FIG. 2, during a transaction, data is provided from a user to a local master server (e.g., P1) comprised within a datacenter (e.g., datacenter DC1). The data is written to the secondary servers (e.g., S2 and S3) and also synchronized to the local master server (e.g., GP1) of the other datacenter (e.g., datacenter DC2). Therefore, a plurality of servers (P1, GP1, S1, S2, S3, and S4) comprise replicas of the user data.

As provided herein, synchronization is implemented according to multiple synchronization components. To achieve multilevel synchronization, data received from a user is prioritized and respective priorities of user data are synchronized using one of the multiple synchronization components. The use of multiple synchronization components allows for large amounts of data to be synchronized in an ordered manner.

Referring again to FIG. 2, in one example, the active-active configuration of the datacenter infrastructure allows for a high priority user data to be synchronized according to one synchronization component (e.g., synchronously written to master servers in respective active datacenters), while datacenters which do not accept high priority user data directly may be synchronized according to a different synchronization component (e.g., an asynchronous mechanism).

Figure 3:
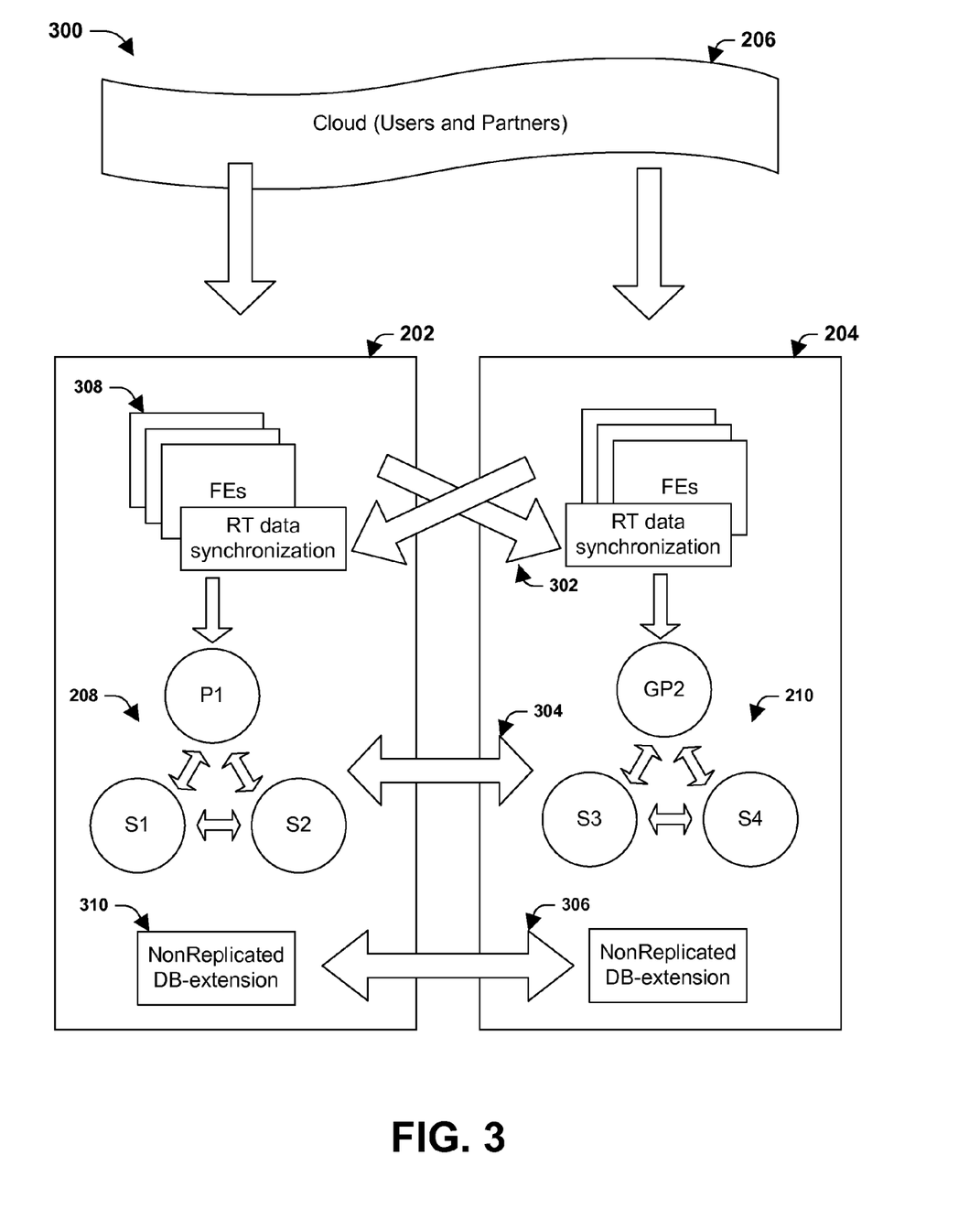
FIG. 3 illustrates a block diagram of a multilevel data synchronization between two datacenters.

FIG. 3 illustrates an exemplary block diagram of a multilevel synchronization between two datacenters. It will be appreciated that the multilevel synchronization may be implemented in a variety of ways and that FIG. 3 only illustrates one possible example.

As illustrated in FIG. 3, determination of the priority associated with user data is determined based upon the importance of the user data in a transaction. For example, user data not routinely used to perform a given service may be placed in a lower priority than user data routinely used to perform the given service. As illustrated in FIG. 3, user data synchronization between datacenters DC1 and DC2 is implemented according to three different synchronization components 302, 304, and 306 (e.g., illustrated as arrows). Respective synchronization components are associated with a particular priority. In one example, data used to provide a service to a user is assigned to a highest priority which utilizes a real time synchronization component 302, data not routinely used to provide a service (and which can therefore be inconsistent during outages) is assigned to a lower priority which utilizes an asynchronous synchronization component 304, and data which can be inconsistent between datacenters (e.g., data rarely used to provide a service) is assigned to a lowest priority which utilizes an synchronization component 306 at read time.

For example, a change in user password may be considered to be a piece of data that is kept consistent between datacenters for proper operation of a service, thereby being synchronized according to a high priority real time synchronization. In contrast, a change in a user's zip code may be considered a piece of data where an amount of inconsistency can be tolerated, therefore bring synchronized with a lower priority asynchronous synchronization. Respective priorities allow synchronization dependent upon write availability between datacenters More particularly, the real time synchronization component 302 is used to synchronize a highest priority data. In one example, the highest priority data comprises data is kept consistent across datacenters. In such a synchronization, component data is written to the local master servers of a plurality of datacenters comprised within a computing environment (e.g., cloud computing environment) before returning acknowledgment to a user that the data has been received. In the example of FIG. 3, a front end server (FEs) receives user data and simultaneously utilizes a real time synchronization component 302 to perform a mirrored write request to its local master (e.g., P1) and to a remote datacenter's local master (e.g., GP1). Since the data is synchronized between datacenters, confirmation from both datacenters, DC1 and DC2, is received before the user is notified that the data has been successfully written. In one example, real time synchronization 302 may comprise writing data to the datacenters in parallel. By keeping the data routinely used to provide a service consistent across datacenters, different datacenters can provide a service to a user at substantially any given time.

A second, medium priority, asynchronous replication component 304 may be used for lower priority data. In one example, the medium priority user data comprises data which is kept consistent across a plurality of datacenters in real time, but which can tolerate inconsistencies. In such synchronization, the servers are replicated asynchronously across a plurality of datacenters. FIG. 3 illustrates synchronization of a medium priority data comprised within servers 208, 210 between datacenters according to this synchronization component. It will be appreciated that during failovers user service will proceed since reliable service can be provided without asynchronous synchronization between datacenters.

A third synchronization component may be used for a low priority data. In one example, the low priority data comprises data which can tolerate inconsistencies. In one example, the third synchronization component comprises a snapshot and restore operation during reading of user data from a datacenter (e.g., a snapshot of the data is taken and used to restore the data in other datacenters). This technique allows for the synchronization of large amounts of data, however since it may not be accomplished in real time, for example, inconsistencies may exist between datacenters. Typically this synchronization may be relied upon to facilitate data replication when the volume of data is higher than can be replicated by the other two techniques alone. In one example, a user may read all or substantially all the copies of user data, thereby providing for synchronization of user data to occur at read time. FIG. 3 illustrates synchronization 306 of non replicated database extensions 310 according to this synchronization component.

FIGS. 4-6 are block diagrams of a datacenter infrastructure further illustrating traffic management and routing of user traffic according to a combination of domain name system (DNS) based global load balancing (GLB) and anycast. As illustrated in FIGS. 4-6, the DNS based GLB will return multiple IP addresses spread across the active datacenters during DNS resolution. This may provide both active traffic routing across datacenters and also request level failover at the DNS level during grey network issues (e.g., controlled failovers).

It will be appreciated that the use of an anycast routing scheme allows a number of datacenters located in different geographic regions to act as if they are in the same place. Therefore, the user receives services as if from a single datacenter, but in reality there are a plurality of datacenters in other locations that can also provide the same service. Wherein the datacenters are configured to use an anycast routing system, the anycast system retains an association with a plurality of different datacenters, which are respectively associated with the same IP address. During normal operation, a service request is provided to the "nearest" active datacenter having the IP address, wherein nearest is a term understood in the art to denote the highest quality datacenter connection (e.g., taking into account a number of variables including the present load on a datacenter, the connection between the user and the datacenter, etc.). Upon failure of the nearest active datacenter, the routing system will reroute service requests to the next nearest active datacenter on the anycast routing system, thereby providing substantially uninterrupted routing of a user to an available or otherwise appropriate datacenter within the datacenter infrastructure.

FIG. 4 illustrates a block diagram of a computing environment (e.g., cloud computing environment) as provided herein during normal operation. The computing environment 400 comprises a datacenter infrastructure 402 having two datacenters, 404 and 406, configured to receive data from a first user's computer 408 and a second user's computer 410. A domain name system (DNS) server 412 assigns the same IP addresses to respective datacenters, which are connected by an anycast routing scheme 414. For example, when the first user requests a service, the first user's computer 408 will be directed, over the internet, to a domain name (i.e., associated with an IP address) of a datacenter 404. To get a location associated with the domain name the user's computer may query the DNS server 412 for the IP address associated with that domain name. Once the first user's computer 408 has an IP address it can exchange data with the datacenter 404. As illustrated in FIG. 4, the first user's computer 408 receives services from datacenter 404 and a second user's computer 410 receives services from datacenter 406.

In one particular example, respective datacenters, 404 and 406, are assigned the same two IP addresses, a first IP address (A.b.c.d.1) and a second IP address (A.b.c.d.2). The IP addresses form an inverse priority hierarchy for incoming data between the two datacenters. For example, for datacenter 404 the DNS assigns the first IP address (A.b.c.d.1) as a high priority IP address (e.g., for high priority traffic) and the second IP address (A.b.c.d.2) as a low priority IP address (e.g., for low priority traffic). Whereas, for datacenter 406 the DNS assigns the first IP address (A.b.c.d.1) as a low priority IP address and the second IP address (A.b.c.d.2) as a low priority IP address. During normal operation the first user's computer 408 connects to the datacenter 404 using the first (high priority) IP address (A.b.c.d.1) and the second user's computer 410 connects to datacenter 406 using a second (high priority) IP address (A.b.c.d.2).

FIG. 5 illustrates a block diagram of a computing environment 400 during a partial failure of the connection between a user and a datacenter. In one example, the partial failure comprises a controlled failover. During controlled failover a problem arises with a datacenter resulting in a degree of failure which impairs user service. For example, datacenter 404 may be operating but fail to properly receive 1 in 10 data packets from the first user's computer 408. To correct for this problem a control failover may be performed. During a controlled failover normal operation (e.g., requests for service made by users are routed to a plurality of active datacenters) may be suspended and the connection between the first user's computer 408 and the improperly operating datacenter 404 may be terminated (e.g., shutdown). The traffic load from the first user's computer 408 may be instead disposed to datacenter 406 for substantially uninterrupted provision of service.

More particularly, during a controlled failover the service provided to the first user's computer 408 will remain on the same IP address (A.b.c.d.1), but will be rerouted from datacenter 404 to datacenter 406. This will result in datacenter 406 receiving data from the second user's computer 410 on a high priority IP address (A.b.c.d.2) and data from the first user's computer 408 on a low priority IP address (A.b.c.d.1). Therefore, the first user's computer 408 will not have to switch IP addresses during a controlled failover.

FIG. 6 illustrates an alternative example of traffic routing as provided herein. FIG. 6 illustrates a block diagram of the computer environment during a complete failure of communication between a user and a datacenter (e.g., a user level failover for networking issues). During a user level failover for networking issues the connection between a user's computer and datacenter malfunctions resulting in total failure of service. To correct for this problem the IP address from the failing datacenter is removed from broadcasting and user traffic is immediately sent to an alternative datacenter.

For example, as illustrated in FIG. 6 the connection between the first user's computer 408 and datacenter 404, based upon the first IP address (A.b.c.d.1), fails. The first user's computer 408 changes IP addresses to the second IP address (A.b.c.d.2) and is rerouted datacenter 406. This will cause the first user's computer 408 to automatically transmit exclusively to the second IP address (A.b.c.d.2) and therefore will cause instantaneous failover since the anycast system will once again relook for the nearest datacenter to provide service to the user. This automatic failover mitigates service downtime.

Figure 7:
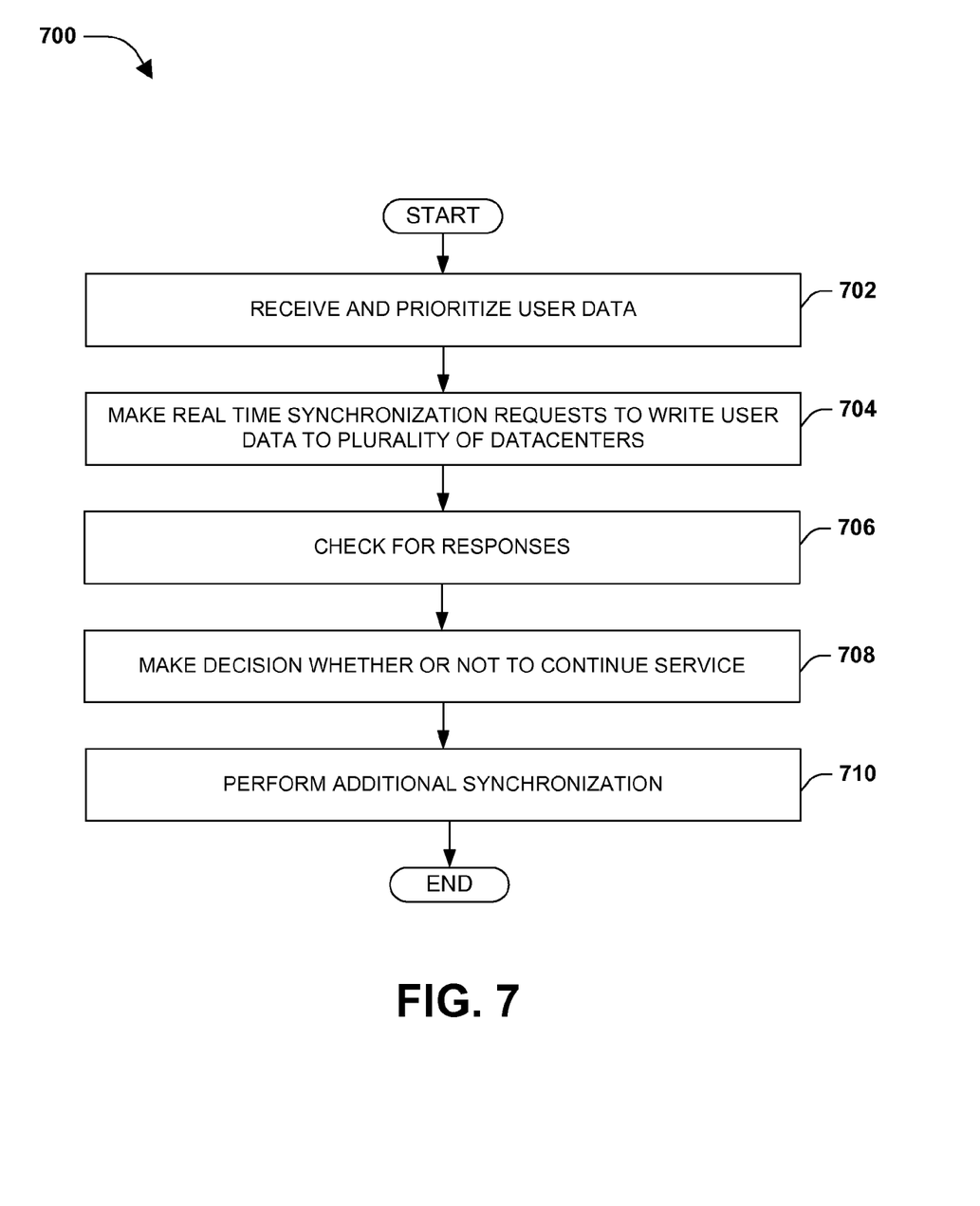
FIG. 7 is a flow chart illustrating an exemplary method of source code version control.

FIG. 7 illustrates an exemplary method 700 of multilevel synchronization across a plurality of datacenters configured to provide services to a user. More particularly, method 700 relates to a method by which received user data is prioritized according to its importance to user service provision. The sorted data is then synchronized by various components to facilitates substantially continuous synchronization of user data across datacenters of a datacenter infrastructure. The method serves to improve the reliability and/or service of a plurality of datacenters supporting a cloud computing environment, for example, by synchronizing the data stored in respective datacenters so that different datacenters can provide service to a user.

At 702 data is received by a datacenter, from a user transaction, and is prioritized. The priority of data respectively corresponds to a synchronization component used to synchronize data between datacenters of a datacenter infrastructure. That is, based upon the priority of the data, a datacenter can determine a synchronization component by which to synchronize the data with other datacenters. In one example, data is prioritized into three different priorities: data that cannot tolerate inconsistencies between datacenters, data that can tolerate minor inconsistencies, and data that can tolerate major inconsistencies.

Real time synchronization requests are made to write user data to a plurality of datacenters at 704. The real time synchronization requests are associated with the highest priority user data (e.g., data which cannot tolerate inconsistencies between datacenters). The requests are made to respective datacenters comprised within a datacenter infrastructure comprising a plurality of datacenters. In one example, requests are made by a front end server comprised within a datacenter that is providing a service to a user.

At 706 responses for the real time synchronization requests are checked for. A response to the real time synchronization requests will tell the requester whether or not the data has successfully been written to the plurality of datacenters and therefore whether the data is synchronized across the datacenters. In one example, the front end server providing the user server may receive the requests.

A decision whether or not to proceed with the user service is made based upon the responses received at 708. If requests are not received from the active datacenters, then it is assumed that the data is not synchronized across the datacenters and a decision is made not to proceed. If requests are received from the active datacenters, then it is confirmed that the data has been synchronized across datacenters, a decision is made to proceed, and a confirmation is sent to the user that the data has been successfully stored.

Additional synchronization may be performed between the datacenters at 710. The additional synchronization relates to the synchronization of the lower priority data. In one example, the additional synchronization comprises performing an asynchronous replication of data which can tolerate inconsistencies between the plurality of datacenters and/or performing a synchronization between the plurality of datacenters during at read time which is implemented by using a snapshot of the data to replicate the data to other datacenters.

Figure 8:
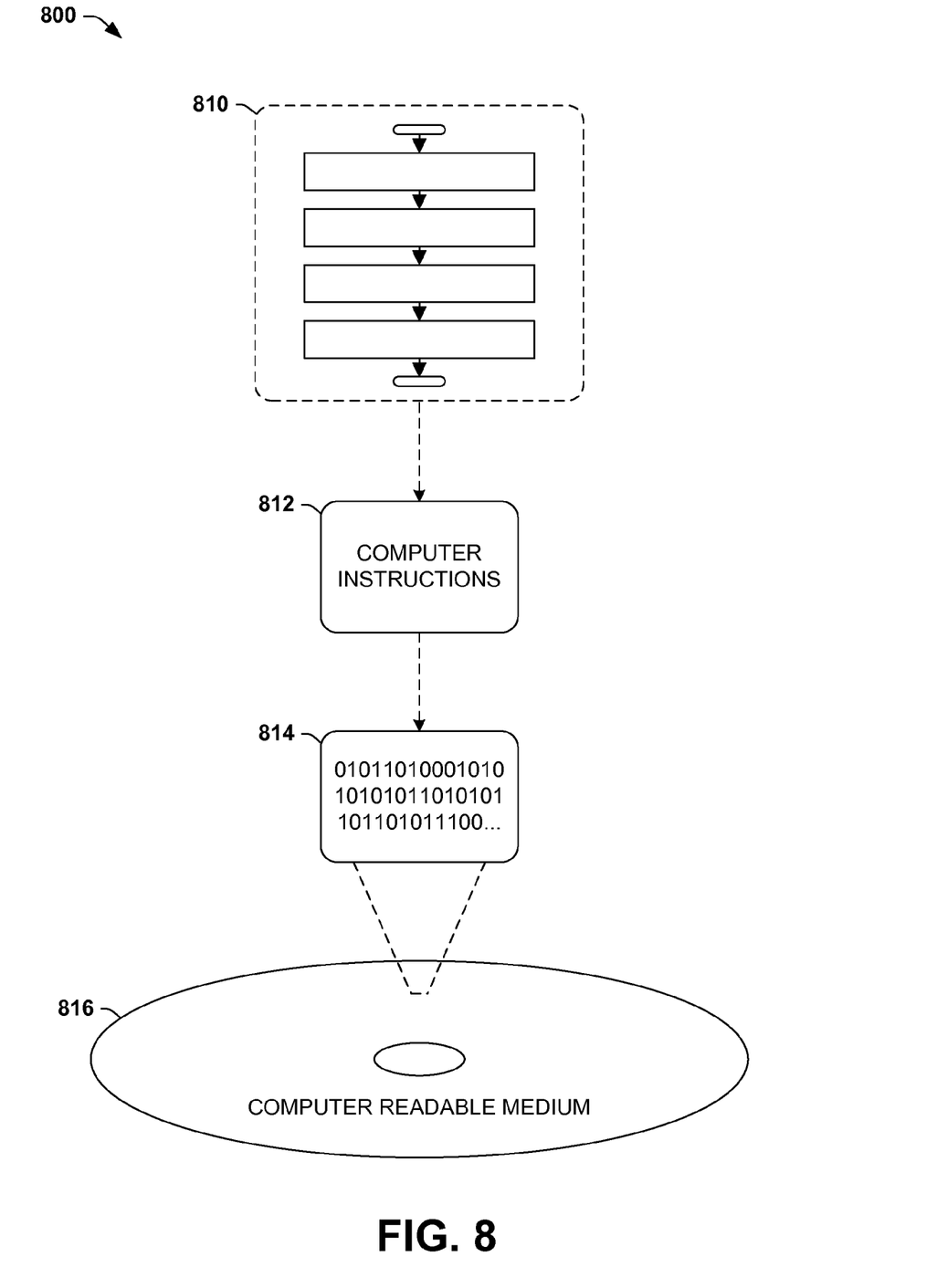
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 100 of FIG. 1, for example. In another such embodiment, the processor-executable instructions 814 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
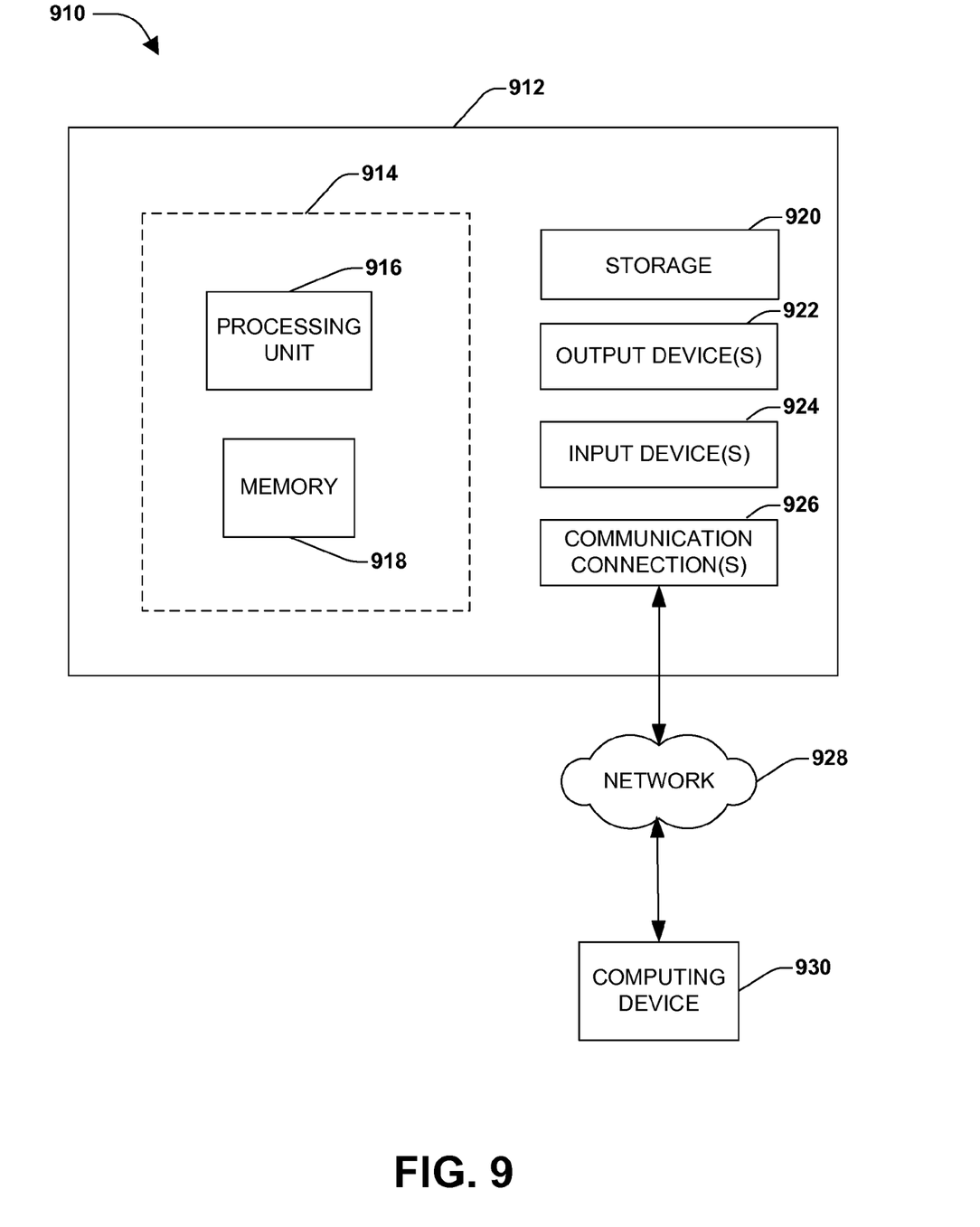
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A tangible computer readable storage device comprising computer executable instructions that when executed via a processor perform a method for synchronizing user data between one or more datacenters based upon priority of the user data, comprising:
   determining a priority of user data received at an active datacenter, the priority indicative of an importance of the user data in providing a service to a user; and
   performing a multilevel synchronization of the user data between one or more datacenters based upon the priority of the user data, the multilevel synchronization corresponding to a real-time synchronization for high priority user data, asynchronous replication for medium priority user data, and a read-time synchronization for low priority user data, the performing a multilevel synchronization comprising at least one of:
      synchronizing the high priority user data with a high priority IP address assigned to a first datacenter and a second datacenter;
      synchronizing the medium priority user data with a medium priority IP address assigned to the first datacenter and the second datacenter; and
      synchronizing the low priority user data with a low priority IP address assigned to the first datacenter and the second datacenter.

2. The tangible computer readable storage device of claim 1, the high priority user data used to perform one or more services more frequently than the low priority user data is used to perform one or more services.

3. The tangible computer readable storage device of claim 1, comprising:
   upon a complete failure of a connection between the user and a third datacenter, rerouting traffic from the user to a second high priority IP address of a fourth datacenter.

4. The tangible computer readable storage device of claim 1, comprising:
   upon a partial failure of a connection between the user and a third datacenter, rerouting traffic from the user to a second low priority IP address of a fourth datacenter.

5. The tangible computer readable storage device of claim 1, the performing a multilevel synchronization comprising:
   utilizing an anycast routing scheme.

6. The tangible computer readable storage device of claim 1, at least one of the one or more datacenters connected to a network.

7. The tangible computer readable storage device method of claim 6, the network comprising the Internet.

8. The tangible computer readable storage device of claim 1, comprising:
   balancing traffic received from the user between at least some of the one or more datacenters.

9. The tangible computer readable storage device of claim 1, comprising:
   utilizing a domain name system (DNS) to route at least some of the user data to at least one datacenter.

10. A system for synchronizing user data between one or more datacenters based upon priority of the user data, comprising:
    a multilevel synchronization component, implemented at least in part via hardware, configured to:
       determine a priority of user data received at an active datacenter, the priority indicative of an importance of the user data in providing a service to a user;
       perform a multilevel synchronization of the user data between one or more datacenters based upon the priority of the user data, the multilevel synchronization corresponding to a real-time synchronization for high priority user data, asynchronous replication for medium priority user data, and a read-time synchronization for low priority user data; and
       at least one of:
          synchronize the high priority user data with a high priority IP address assigned to a first datacenter and a second datacenter;
          synchronize the medium priority user data with a medium priority IP address assigned to the first datacenter and the second datacenter; and
          synchronize the low priority user data with a low priority IP address assigned to the first datacenter and the second datacenter.

11. The system of claim 10, the medium priority user data used to perform one or more services more frequently than the low priority user data is used to perform one or more services.

12. The system of claim 10, the multilevel synchronization component configured to:
    reroute traffic from the user to a second high priority IP address of a third datacenter based upon a complete failure of a connection between the user and a fourth datacenter.

13. The system of claim 10, the multilevel synchronization component configured to:
    reroute traffic from the user to a second low priority IP address of a third datacenter based upon a partial failure of a connection between the user and a fourth datacenter.

14. The system of claim 10, the multilevel synchronization component configured to:
    utilize an anycast routing scheme.

15. The system of claim 10, the multilevel synchronization component configured to:
    utilize a domain name system (DNS) to route at least some of the user data to at least one datacenter.

16. A method for synchronizing user data between one or more datacenters based upon priority of the user data, comprising:
    determining a priority of user data received at an active datacenter, the priority indicative of an importance of the user data in providing a service to a user; and
    performing a multilevel synchronization of the user data between one or more datacenters based upon the priority of the user data, the multilevel synchronization corresponding to a real-time synchronization for high priority user data, asynchronous replication for medium priority user data, and a read-time synchronization for low priority user data, the performing a multilevel synchronization comprising at least one of:
       synchronizing the high priority user data with a high priority IP address assigned to a first datacenter and a second datacenter;
       synchronizing the medium priority user data with a medium priority IP address assigned to the first datacenter and the second datacenter; and
       synchronizing the low priority user data with a low priority IP address assigned to the first datacenter and the second datacenter, at least some of the method implemented at least in part via a processing unit.

17. The method of claim 16, the high priority user data used to perform one or more services more frequently than the medium priority user data is used to perform one or more services.

18. The method of claim 16, comprising:
    upon a complete failure of a connection between the user and a third datacenter, rerouting traffic from the user to a second high priority IP address of a fourth datacenter.

19. The method of claim 16, comprising:
upon a partial failure of a connection between the user and a third datacenter, rerouting traffic from the user to a second low priority IP address of a fourth datacenter.

20. The method of claim 16, the high priority user data comprising a password.

* * * * *